United States Patent
Leger et al.

(10) Patent No.: US 8,793,072 B2
(45) Date of Patent: Jul. 29, 2014

(54) METHOD OF MONITORING A GEOLOGICAL GAS STORAGE SITE BY STRATIGRAPHIC INVERSION OF SEISMIC DATA

(75) Inventors: Michel Leger, Rueil-Malmaison (FR); Vincent Clochard, Sartrouville (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 533 days.

(21) Appl. No.: 13/043,576

(22) Filed: Mar. 9, 2011

(65) Prior Publication Data

US 2011/0251797 A1    Oct. 13, 2011

(30) Foreign Application Priority Data

Mar. 16, 2010 (FR) ...................... 10 01042

(51) Int. Cl.
 *G01V 1/28* (2006.01)
 *G01V 1/02* (2006.01)
 *G01V 1/22* (2006.01)
(52) U.S. Cl.
 USPC ............. 702/14; 702/10; 702/11; 702/13
(58) Field of Classification Search
 USPC .......... 702/10, 11, 13, 14, 179, 182, 183; 166/270; 703/2; 708/806
 See application file for complete search history.

(56) References Cited

U.S. PATENT DOCUMENTS

| | | | |
|---|---|---|---|
| 6,374,201 B1 | 4/2002 | Grizon et al. | |
| 6,522,973 B1 * | 2/2003 | Tonellot et al. | 702/16 |

(Continued)

FOREIGN PATENT DOCUMENTS

| | | |
|---|---|---|
| FR | 2 765 692 | 1/1999 |
| FR | 2 800 473 | 5/2001 |
| FR | 2 873 823 | 2/2006 |
| FR | 2 933 499 | 1/2010 |

OTHER PUBLICATIONS

Chadwick, A. et al: "Quantitative Analysis of Time-Lapse Seismic Monitoring Data at the Sleipner $CO_2$ Storage Operation," The Leading Edge, Society of Exploration Geophysicists, US LNKD-DOI:10.1190/1.3304820, vol. 29, No. 2, Feb. 1, 2010 (Feb. 2, 2010_, pp. 170-172, 174, XP001551083, ISSN: 1070-485x.

(Continued)

*Primary Examiner* — Sujoy Kundu
*Assistant Examiner* — Felix Suarez
(74) *Attorney, Agent, or Firm* — Antonelli, Terry, Stout & Kraus, LLP.

(57) ABSTRACT

The invention is a method of monitoring an underground formation into which a gas is injected or from which a gas is produced, by a stratigraphic inversion of seismic data with anamorphosis of impedances. Pre-injection and post-injection seismic data are acquired. A pre-injection seismic impedance cube IP1 is determined by a stratigraphic inversion of the pre-injection seismic data. An anamorphosis function α is defined by a function comprising a positive lower limit B1, an upper limit B4, an identity interval defined between limits B2 and B3, with B1<B2<B3<B4. A value for each limit B1, B2, B3 and B4 is associated with each cell of the cube. Post-injection seismic impedances IP2 are determined by a stratigraphic inversion of the post-injection seismic data wherein the anamorphosis function α is applied to seismic impedances IP2. The gas is located within the zone by identifying the cells where IP2<IP1.

24 Claims, 3 Drawing Sheets

(56) References Cited

U.S. PATENT DOCUMENTS

| | | |
|---|---|---|
| 7,200,533 B2 * | 4/2007 | Hu et al. ............................ 703/2 |
| 7,363,163 B2 * | 4/2008 | Le Ra Valec-Dupin et al. ............................... 702/12 |
| 2006/0023569 A1 | 2/2006 | Agullo et al. |
| 2010/0004870 A1 | 1/2010 | Tonellot et al. |
| 2011/0196613 A1 * | 8/2011 | Sallee et al. .................... 702/14 |

OTHER PUBLICATIONS

Chadwick, R. A., et al: "Latest Time-Lapse Seismic Data from Sleipner Yield New Insights into $CO_2$ Plume Development," Eneregy Procedia, Elsevier LNKD-DOI:10.1016/J. Egypro. 2009.01.274, vol. 1, No. 1, Feb. 1, 2009, pp. 2103-2110, XP 026472121, ISSN: 1876-6102.

* cited by examiner

METHOD OF MONITORING A GEOLOGICAL GAS STORAGE SITE BY STRATIGRAPHIC INVERSION OF SEISMIC DATA

BACKGROUND OF THE INVENTION

1. Field of the Invention

The invention relates to underground media development. In particular, the invention relates to a method of monitoring an underground formation wherein either gas is injected, for example, for monitoring of a geological gas storage site or gas is extracted, for example, from the underground formation within hydrocarbon production.

2. Description of the Prior Art

Responsible and efficient monitoring of an underground storage site for example for gas, carbon dioxide after capture, requires good knowledge of the spatial distribution of the gas, and of the evolution of distribution over time. Drilling wells is a good way to learn what is in the subsoil but, is costly and the question about what there is left in the subsoil remains. Seismic imaging provides information distributed over the entire explored three-dimensional zone, even though its spatial resolution is limited. Seismic prospecting sends waves into the subsoil from various shotpoints and uses many receivers, to record the echoes reflected back by the boundaries between the geological layers.

If gas is injected into a reservoir, the acoustic impedance thereof, which is the product of the speed of sound by the density, decreases and the echoes are modified. All the impedances are expressed in $(m/s) \cdot (g \cdot cm^3)$ in the description. Whether gas storage is temporary, as for natural gas, or definitive, as for carbon dioxide, seismic imaging thus is a candidate for monitoring the gas, whether it spreads through the reservoir, undergoes a chemical transformation or even possibly leaks to the surface.

Seismic prospecting can be performed almost everywhere on Earth including onshore as well as offshore. Historically, seismic data have been acquired for a long time along rectilinear 2D profiles. Today, 3D acquisitions are predominant and allow three-dimensional imaging of the subsoil at increasingly great depths. Large hydrocarbon reservoirs have been recently discovered as deep as between 5 km and 7 km.

Onshore, the seismic wave source can be an explosive buried in a wellbore at a depth of meters or decameters. But most frequently a vibrator in a heavy truck provided with a solid metal plate under the truck is raised to allow displacement of the vehicle, but on which it lifts and rests with all its weight when it is about to emit. The truck is then made to oscillate on its plate by jacks, which sends waves into the ground. Unlike explosives, the vibrator cannot send short impulses. The shortness of the wave conditions the resolution of the resulting images. Facing the same problem as radars: it is not possible to emit a signal that is both very brief and very energetic. The vibrator solves the problem according to the same principle by emitting a frequency-modulated signal whose duration, of the order of one minute for the vibrator, allows sending a high-energy wave. To recover the shortness of the wave, the emitted wave train is designed in such a way that its autocorrelation is as short as possible, and the cross-correlation of the seismic records with the emitted wave train provides records close to those provided by an impulse source. The frequency band of the emitted signals is variable according to the depth of the target and to the nature of the subsoil to roughly range between 10 and 100 Hz. The echoes reflected by the mechanical property discontinuities of the formations are converted to electrical signals by thousands of pickups referred to as geophones, which are distributed around the source ranging from hectometers to kilometers. These records are then conveyed by radio to a truck which is referred to as the lab where they are transferred to a hard disk.

Offshore, a boat tows several arrays of air guns immersed to a depth of meters. These arrays are carried off course by hydrodynamic devices with respect to the boat trajectory, which allows their alignment across this trajectory. Each air gun array works in turn, with one shot every five to ten seconds. Furthermore, the boat tows streamers which are kilometers in length parallel to the boat trajectory and arranged at regular intervals. The boat can also be assisted by two other boats with one on each side to provide, for example, for so-called wide-azimuth acquisitions in order to better visualize beneath salt domes in the Gulf of Mexico. Towed at a depth of meters, these streamers are plastic tubes which are centimeters in diameter and contain a metallic cable for tensile strength. Pressure detectors, referred to as hydrophones, convert the waves into electrical signals. Electrical wires transmit these signals to the boat and a filling liquid of selected density is provided in the streamers so that they neither float nor sink. In order to counter the effect of the marine currents, an acoustical system measures permanent defects of the geometry of the device and drives deflectors that correct them.

After acquisition, the data are processed to form images of the subsoil. A segment that connects the point-source to the point-receiver, whose middle is called the "midpoint" and whose length is called the "offset", corresponds to each record. A grid map of the studied zone is defined and the records are grouped together into collections whose midpoints share the same square in the grid. Individual records are often being affected by noise and are added up so that the signal will increase in n, the number of signals stacked, and the noise in root of n, which improves the signal-to-noise ratio. A velocity analysis determines the dynamic corrections that will compensate for the additional path travelled by the waves whose emission and reception points are distant. After applying these dynamic corrections, common-depth-point stacking is performed. Although the simplistic hypotheses of common-depth-point shooting are often grossly at fault (piedmonts, salt domes), it is systematically performed. Common-depth-point shooting provides images by the artifice that the stacked record corresponding to each midpoint is associated therewith and the time axis being oriented downward. The drawback of this image is that it is not geometrically correct. The images are in fact identical and the thicknesses of two layers may seem distinct because their velocities are different. Furthermore, if the layers are inclined, the point where the reflection occurs is arbitrarily brought to the vertical of the midpoint, which is groundless. In order to overcome these drawbacks, a processing method referred to as "migration", which has many variants, is used. Time migrations keep time as the vertical coordinate which is unlike depth migrations. When the wave propagation is complicated, the common-depth-point shooting hypotheses are not viable and pre-stack migration is preferred to post-stack migration. All the migrations require knowledge of the velocity field, but this requirement is critical for depth migration.

Stratigraphic inversion is a known process which is practiced as a computer implemented process, provides better knowledge of the reservoir and converts the seismic image where the reflections indicate impedance contrasts to a three-dimensional map of the acoustic impedance itself and provides valuable information on the nature of the rocks.

Stratigraphic inversion comprises three stages. The first stage is well-to-seismic calibration, whose goal is to identify the wave train, referred to as "wavelet", that has propagated in the subsoil. The impedance log is therefore calculated from sonic logs (sound velocity) and density logs, and a low-pass filter is applied thereto in order to bring it into the seismic frequency band. The reflection coefficient sequence is deduced from this impedance log, and eventually the wavelet by comparison with the well seismic (common-depth-point data, often time migrated). The second stage is the construction of the a priori model, whose goal is to make up for the lack of very low frequencies in the seismic method. Horizons picked on the seismic therefore determine several units are defined on which laminations whose laminae are the deposition isochrones. Each lamination allows interpolation of the impedances known for the wells at any point of the corresponding unit. For each unit, the lamination is defined according to three options: parallel to the upper horizon, to the lower horizon, or conformable. Velocity analyses may be used to make up for the lack of well data, but then density values are required. The third stage is inversion proper, which finds the impedance field that minimizes the sum of two functionals. The first one, referred to as "seismic functional", measures the norm $L^2$ difference between the seismic calculated on the current impedance and the observed seismic. The second one, referred to as "geological functional", measures the difference between the current impedance and the a priori impedance. This geological functional is decomposed into two terms, a norm $L^2$ on the difference between the calculated and a priori impedances, and a norm $L^2$ on the gradient of this difference after projection of this gradient on the plane tangential to the local lamina of the lamination. Equation (1) makes this functional explicit:

$$F(I)=p_1\|w*R(I)-S_0\|_{L2}+p_2\|I-I_0\|_{L2}+p_3\|P_T(\nabla(I-I_0))\|_{L2}, \quad (1)$$

where I designates the impedance field, $p_1$ the weight of the seismic functional that depends on the noise-to-signal ratio, w the estimated wavelet upon well-to-seismic calibration, R(I) the reflection coefficient field calculated on the impedance field I, * the convolution, $S_0$ the observed seismic, $p_2$ the weight of sub-term $L_2$ on the difference with the a priori impedance I, and $p_3$ the weight of sub-term $L_2$ on the gradient of the difference with the a priori impedance. It can be noted that since the a priori model is generally smooth, a gradient term in the functional tends to smooth the result, which is not desirable because the vertical resolution is valuable, which is why the gradient is projected ($P_T$ in Equation (1)) onto a plane tangential to the local lamina of the sedimentary lamination. This global functional is minimized by a conjugate gradient. This stratigraphic inversion has been patented in French Patent 2,765,692.

A first stratigraphic inversion variant is pre-stack stratigraphic inversion. The datum is no longer only the common-depth-point datum, but a set of several (in practice, three to five) partial stacks wherein the records are sorted out in angle classes according to the angle of incidence upon reflection. Unlike fluids where only one wave type is propagated, two wave types are propagated in the elastic solids of the rocks which are the P waves that arrive first and the S waves that arrive second. P waves are compressional-dilatational waves, like acoustic waves in fluids, that is the direction of vibration of the matter upon passage of the wave is parallel to the direction of propagation of the wave. S waves are shear waves where the direction of vibration is transverse to the direction of propagation. The value of pre-stack stratigraphic inversion is that the dependence of the reflection coefficients as a function of the angle of incidence allows determination not only of the P impedance, but also the S impedance, the product of velocity S by the density, and to a lesser extent the density itself. The pre-stack stratigraphic inversion is disclosed in French Patent 2,800,473.

A second stratigraphic inversion variant is the inversion of multi-component data. In a homogeneous or normal incidence medium, the P waves are transmitted or reflected as P and the S waves as S. In the case of oblique incidence on an interface, the P or S wave is converted into two reflected waves, a P and an S wave, and two transmitted waves, P and S. Onshore, three-component (3C) geophones allow simultaneous recording of the PP waves (P in the forward path and P in the return path) and the PS waves (P in the forward path and S in the return path), which are then separated by processing by their different polarization (direction of vibration). Offshore, recording of PS waves is impossible because the S wave is converted to a weak P wave in the water, unless 3C geophones are installed on the seabed (with OBCs for example). The use of S waves is described in French Patents 2,800,473 and 2,873,823.

A third variant relates to anisotropic stratigraphic inversion. Typically, when the layers are fractured in a certain direction, the seismic waves, whose wavelengths are much greater than the mean distance between fractures, travel through a homogeneous but anisotropic medium. In this case, the offset, which is usually the source-receiver distance, becomes a horizontal vector with a length and an azimuth. The stratigraphic inversion itself becomes azimuth-dependent and its results provide information on the orientation of the fractures, at least when a family of fractures clearly dominates the others.

A fourth variant relates to monitoring of a gas storage site whose evolution over time is followed by seismic acquisitions that are staggered over time. For the sake of simplicity, two periods before and after injection (it could also be withdrawal) are discussed but what follows can apply to three periods or more. The first stage carries out a stratigraphic inversion for each period. In the second stage, law t2(t1) is determined with t1 being the seismic time of any horizon at period 1, and t2 being the time of the same event at period 2. This is referred to as warping, which is compensating for the fact that the fluid change modifies the velocity of the rocks, and therefore the time of the reflections. The third stage carries out a joint inversion of the data of the two periods. The fact that the result in the layers where it is known that there is no gas is constrained by two seismic steps instead of one makes it more reliable and reinforces, as an indirect consequence, the result in the gas zone. This technique is described in French Patent 2,933,499.

If gas is injected into a reservoir, then its acoustic impedance, that is the product of the speed of sound by density, decreases and the echoes are modified. Whether this gas storage is temporary, as for natural gas, or definitive, as for carbon dioxide, seismic imaging thus is candidate for monitoring the history of the gas, whether it spreads through the reservoir, undergoes a chemical transformation or even possibly leaks to the surface.

The seismic frequency band is limited at the top and bottom ends. An impedance decrease in a layer appears in the seismic data, as well as the association of a slight impedance decrease in this layer with a slight increase in the neighboring layers. This "zero mean" effect is harmful to the quantitative estimation of the volume of gas in place because the relation between impedance and saturation is distorted thereby.

SUMMARY OF THE INVENTION

The invention relates to an alternative method of monitoring an underground formation by a computer stratigraphic inversion of seismic data, wherein the impedance is compelled not to decrease or not to increase where it is known to be impossible, while preserving the value of the variation and therefore enabling better estimations of the amount of gas which is injected or produced. The method achieves this by a three-dimensional anamorphosis during the stratigraphic inversion.

The invention thus is an alternative method of monitoring an underground formation into which a gas is injected, from a first set of seismic data imaging a subsoil zone and acquired before a gas injection into an underground formation of the zone, and from a second set of seismic data imaging the subsoil zone and acquired after the gas injection. The method comprises the following stages:

constructing a pre-injection P-wave seismic impedance cube IP1 by a stratigraphic inversion of the first seismic data set, wherein the cube discretizes the subsoil zone into a set of cells;

defining an anamorphosis function a by a function comprising a positive lower limit B1, an upper limit B4, an identity interval defined between limits B2 and B3, with B1<B2<B3<B4;

associating with each cell of the cube a value for each limit B1, B2, B3 and B4, associating with each cell of the cube a post-injection P-wave seismic impedance IP2 by a stratigraphic inversion of the second seismic data set, wherein the anamorphosis function α is applied to the seismic impedance IP2;

locating the gas within the zone by comparing the seismic impedance IP2 with the seismic impedance IP1.

According to the invention, the anamorphosis function a can be used to obtain the seismic impedance IP2 during stratigraphic inversion of the second seismic data set, by minimizing a global functional F(Ig) of the type as follows:

$$F(Ig)=p_1\|w*R(\alpha(Ig))-S_0\|_{L2}+p_2\|Ig-Ig_0\|_{L2}+p_3\|P_T(\nabla(Ig-Ig_0)\|_{L2}$$

where Ig represents Gaussian impedances and $\alpha(Ig)=IP2$; $p_1$, $p_2$ and $p_3$ weights; w is an estimated wavelet; $R(\alpha(Ig))$ is a reflection coefficient field calculated from the true impedances IP2; * represents the convolution product, $S_0$ the second seismic data set, and $P_T$ represents a projection onto a plane tangential to a local lamina of a sedimentary lamination.

The seismic data can be post-stack data or multi-component data. They can also be pre-stack data. In the latter case, it is possible to additionally associate with each cell:

a pre-injection S-wave seismic impedance IS1;

a post-injection S-wave seismic impedance IS2 obtained by the stratigraphic inversion of the second seismic data set, wherein a second anamorphosis function is used for the seismic impedances IS2; and locating the gas in the zone by comparing the seismic impedance IP2 with the seismic impedance IP1, and by comparing the seismic impedance IS2 with the seismic impedance IS1.

The second anamorphosis function can be defined by a function comprising a positive lower limit BS1, an upper limit BS4, an identity interval defined between limits BS2 and BS3, with BS1<BS2<BS3<BS4, and $$BSn=IP_0\sqrt{\frac{1-2BPn}{2(1-BPn)}}$$

with: n being an integer from 1 to 4; $IP_0$ being an a priori P-wave seismic impedance; BP1 and BP4 being an interval of possible Poisson coefficients; and BP2 and BP3 being an interval of likeliest Poisson coefficients.

According to an embodiment, the stratigraphic inversion of the second seismic data set comprises a minimization of a cost function comprising at least the following functional $F_P$:

$$F_P=\frac{1}{2}\sum_\Omega\left(\frac{2R-1}{2(R-1)}-v_0\right)^2$$

with: $R=IS2^2/IP2^2$, $\Omega$ represents the zone, and $v_0$ an a priori Poisson coefficient.

It is also possible to additionally associate with each cell:

a pre-injection density of the underground formation;

a post-injection density of the underground formation, obtained by the stratigraphic inversion of the second seismic data set, wherein a third anamorphosis function is applied to the post-injection densities; and locating the gas in the zone by comparing the seismic impedance IP2 with the seismic impedance IP1, by comparing the seismic impedance IS2 with the seismic impedance IS1 and by comparing the post-injection density with the pre-injection density.

The third anamorphosis function can be defined by a function comprising a positive lower limit BD1, an upper limit BD4, an identity interval defined between limits BD2 and BD3, with BD1<BD2<BD3<BD4, and $$BDn=BSn^2/\mu_0$$

with μ being an a priori shear modulus.

According to an embodiment, the stratigraphic inversion of the second seismic data set comprises a minimization of the cost function comprising at least the following functional $F_C$:

$$F_C=\frac{1}{2}\sum_{j=2}^N\sum_\Omega\left(\frac{\rho_j}{IS2_j^2}-\frac{\rho_{j-1}}{IS2_{j-1}^2}\right)^2$$

with N being a number of periods wherein $\rho_j$ and $IS_j$ are respectively a density and an S-wave seismic impedance at a period j.

Preferably, the value of limit B3 in a cell is equal to seismic impedance IP1 of the cell.

According to the invention, it is also possible to determine a volume of the injected gas by carrying out the following stages:

determining a porosity of the underground formation;

selecting a relation between gas saturation and P-wave seismic impedance as a function of porosity;

associating with each cell of the cube a gas saturation value by applying the relation to the post-injection P-wave seismic impedance values IP2, determining the injected gas volume by adding up all the gas saturation values and by weighting the sum by the mean porosity and by a volume occupied by a cell of the cube.

Finally, the invention also relates to a method wherein gas injection is replaced by gas extraction from the formation, the first seismic data set being acquired before gas production and the second seismic data set being acquired after the gas production. The value of limit B2 in a cell can then be equal to seismic impedance IP1 of the cell. It is also possible to determine an extracted gas volume by carrying out the following stages:

determining a porosity of the underground formation;

selecting a relationship between gas saturation and P-wave seismic impedance as a function of porosity;

associating with each cell of the cube a gas saturation value by applying the relationship to the post-extraction P-wave seismic impedance values; and determining the extracted gas volume by adding up all the gas saturation values and by weighting the sum by the mean porosity and by a volume occupied by a cell of the cube.

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTION OF THE INVENTION

The invention relates to a method of monitoring an underground formation wherein either gas is injected, for example, for monitoring of a geological gas storage site, or gas is extracted, for example, from the underground formation of hydrocarbon production. Monitoring is performed by a first set of seismic data imaging a subsoil zone and acquired before gas injection/production, and of a second set of seismic data imaging the same zone after gas injection/production.

The method comprises the following:

constructing a pre-injection P-wave seismic impedance cube IP1;

defining an anamorphosis function $Iv=\alpha(Ig)$ that converts a Gaussian impedance Ig to the true impedance Iv (FIG. 1), by a function comprising a positive lower limit B1, an upper limit B4, an identity interval defined between limits B2 and B3, with B1<B2<B3<B4;

associating with each cell of the cube a value for each limit B1, B2, B3 and B4;

associating with each cell of the cube a post-injection P-wave seismic impedance IP2 by a stratigraphic inversion of the second seismic data set, wherein the anamorphosis function a is applied to the seismic impedances IP2; and locating the gas within said zone by identifying cells of the cube where the seismic impedance IP2 which is smaller than the seismic impedance IP1.

The invention is described through a synthetic example corresponding to a carbon dioxide storage site in an underground formation. The method can then comprise the following stages:

1. Seismic data acquisition before and after gas injection
2. Inversion of the seismic data acquired before injection
3. Construction of anamorphosis bound cubes
4. Inversion with anamorphosis of the seismic data acquired after injection
5. Injected gas location
6. Injected gas volume estimation.

In the description of the invention, all the impedances are expressed in $(m/s) \cdot (g/cm^3)$.

Description of the Synthetic Reference Model

Two stratigraphic inversions are one before injection and another one after injection.

Figure 2A:
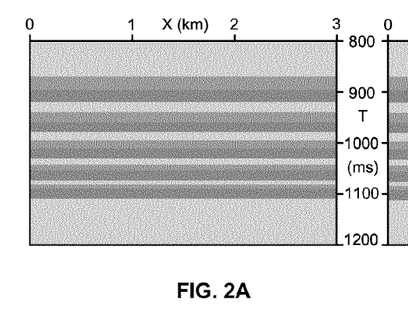
FIG. 2A shows the impedance model Reference.

FIG. 2A shows a vertical cross-section of an impedance field denoted by Reference, with several sandstone reservoirs in dark grey, surmounted by sandy clay layers in medium grey with the clay layers appearing in light grey. All the layers are horizontal, homogeneous and water saturated. X is the abscissa in km, T is the seismic time in milliseconds and IP the impedance P in $(m/s) \cdot (g/cm^3)$.

Figure 2B:
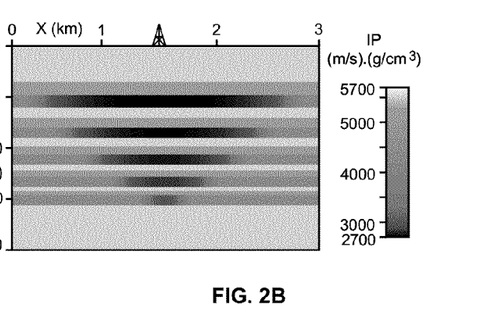
FIG. 2B shows the impedance model Monitor.

FIG. 2B shows a vertical cross-section of an impedance field denoted by Monitor, similar to Reference, but after gas injection into the sandstones. The gas zone is invariant under rotation around the vertical passing through the well.

Figure 3A:
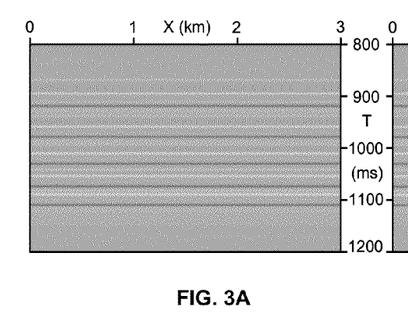
FIG. 3A illustrates the seismic data associated with impedance model Reference (FIG. 2A)
Figure 3B:
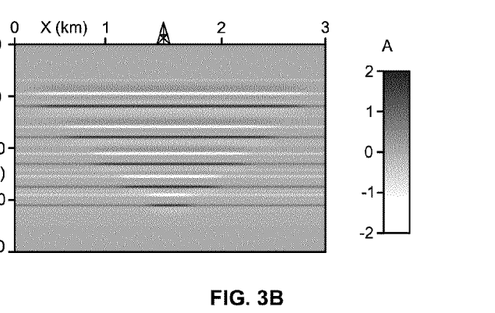
FIG. 3B illustrates the seismic data associated with impedance model Monitor (FIG. 2B)

FIG. 3A shows the common-depth-point data (obtained by 1D modelling) associated with the Reference model. These pre-injection seismic data are denoted by DSAI. FIG. 3B shows the seismic associated with the Monitor model. These post-injection seismic data are denoted by DSPI.

Figure 4:
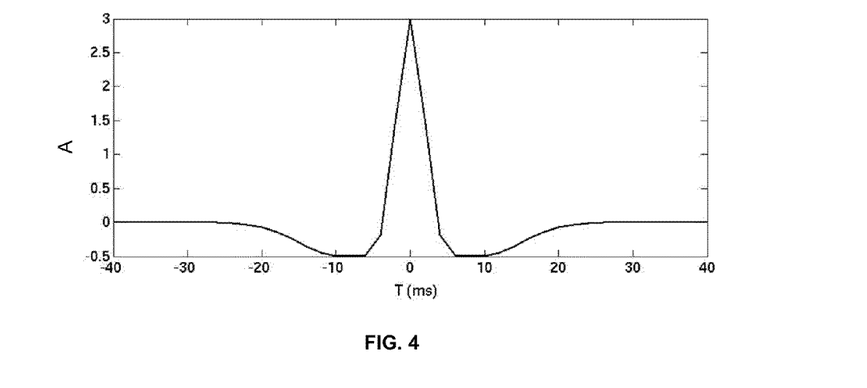
FIG. 4 shows the wavelet used to calculate the seismic data of FIGS. 3A and 3B.

The wavelet used in both cases is the wavelet of FIG. 4. It is the superposition of three 35, 70 and 105-Hz Ricker wavelets. Due to the velocity variation, the position of the layers should differ between the Reference and Monitor models, but the same position has been kept for the sake of simplicity.

The seismic amplitude is denoted by A in the figures. It is given in arbitrary unit.

Application of the Method According to the Invention

1. Seismic Data Acquisition Before and after Gas Injection

According to the example being used to describe the invention, the seismic data that would be obtained by a conventional known acquisition would be the seismic data DSAI (FIG. 3A) for the pre-injection seismic data and the seismic data DSPI (FIG. 3B) for the post-injection seismic data.

2. Inversion of the Seismic Data Acquired Before Injection

A stratigraphic inversion of data DSAI is performed. This stratigraphic inversion allows construction of a pre-injection P-wave seismic impedance cube IP1. This cube discretizes the subsoil zone into a set of cells.

Figure 5A:
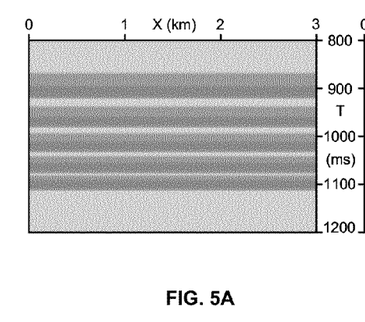
FIG. 5A corresponds to the a priori model used for stratigraphic inversion of the seismic data of FIG. 3A and is a smoothed version of the model of FIG. 2A.

A technique as described in French Patent 2,765,692 is used. To apply this inversion technique:

the wavelet of FIG. 4 is used, the a priori model of FIG. 5, which results from smoothing of the Reference model, an initial model of constant impedance 3500, a 15% noise-to-signal ratio, an uncertainty in the a priori impedance of 500,
a correlation length of 50 m, and
a maximum number of iterations of 300.

The Interwell® (IFP, France) or Presti® (IFP, France) softwares can be used to perform this stage. The minimized functional is:

$$F(I) = p_1 \|w*R(I) - S_0\|_{L2} + p_2\|I - I_0\|_{L2} + p_3\|P_T(\nabla(I - I_0))\|_{L2}, \quad (1)$$

Figure 5B:
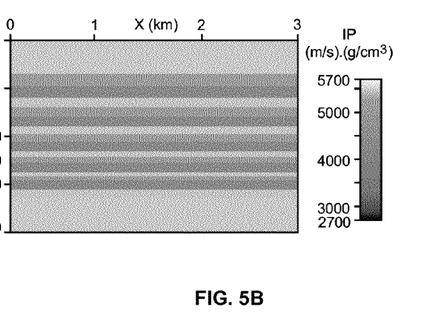
FIG. 5B corresponds to the result, denoted by "Reference1", of the stratigraphic inversion of the seismic data of FIG. 3A using the a priori model of FIG. 5A.

The seismic impedances resulting from this stratigraphic inversion are denoted by Reference1 and illustrated in FIG. 5B.

3. Construction of Three-Dimensional Anamorphosis Bound Cubes

One object of the present invention is to prevent the impedance from decreasing or increasing where it is known to be impossible, while preserving the value of the variation, and thus to enable better estimations of the amounts of buried gas.

To solve this problem, a three-dimensional anamorphosis on the impedances is used, whose bounds are defined at any discretization point of the medium, where the four anamorphosis bounds correspond to each impedance value.

A definition of anamorphosis is proposed in the following document:

Maria Helena DOMINGUES RAMOS, 2002, "Analyse de la pluviométrie sous des systèmes nuageux convectifs—Étude de cas sur des données de la ville de Marseille et de la méthode ISIS de Météo-France", Thesis, Laboratory of Study of Transfers in Hydrology and Environment (LTHE, UMR 5564, CNRS, INPG, IRD, UJF), p. 134.

According to this document, "what is referred to as anamorphosis is any non-decreasing and monotonic function transporting a continuous law to another law (continuous or not). A Gaussian anamorphosis allows expression of the random variable Z of any probability distribution as a function of variable U of the standard Gaussian law".

Figure 1:
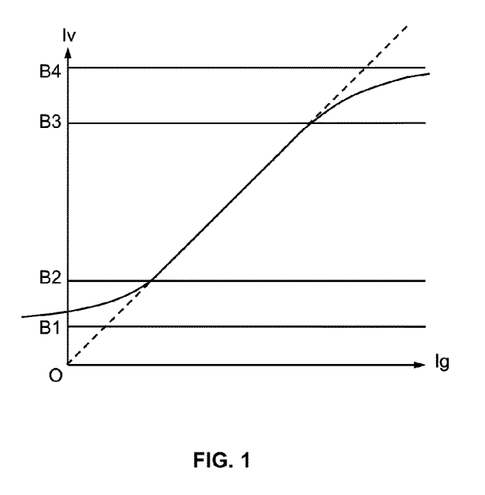
FIG. 1 illustrates an anamorphosis example.

FIG. 1 shows that anamorphosis converts a Gaussian impedance Ig to the true impedance Iv. It can be added that conjugate-gradient optimization requires differentiability of the anamorphosis.

Within the scope of the invention, anamorphosis $\alpha$ is defined by $Iv = \alpha(Ig)$, Iv being the true impedance, anamorphosis of the Gaussian impedance Ig.

In order to meet the objective of preventing the impedance from decreasing or increasing where it is known to be impossible, the anamorphosis function $\alpha$ is defined by a function comprising:
a positive lower limit denoted by B1,
an upper limit denoted by B4, and
an identity interval defined between limits B2 and B3, with B1<B2<B3<B4.

The identity interval, defined between bounds B2 and B3, allows suppression the anamorphosis if all the impedances range between B2 and B3. In fact, in this interval, and by definition, Iv=Ig. In the opposite case, whatever the values of the anamorphosed impedances found at the end of the inversion, return to the true impedances will keep them within the interval contained between B1 and B4. The interest of this identity interval is crucial to allow better estimations of the quantities of buried gas.

An example of anamorphosis a verifying these properties is illustrated in FIG. 1. If all the impedances remain between B2 and B3, the anamorphosis changes nothing, in the opposite case, whatever the values of the Gaussian impedance after inversion (Ig), the corresponding true impedances (Iv) will range between B1 and B4. The dotted line is the graph of the identity function, Iv=Ig.

According to the invention, the anamorphosis bounds are defined at any point. Four anamorphosis bound cubes are thus constructed to adjust the anamorphosis to each sample. A value for each limit B1, B2, B3 and B4 is therefore associated with each cell of the cube. The nature of the geological formations (lithologic facies or seismic facies) can thus be taken into account.

First of all, it is known that the impedances can decrease between Reference and Monitor, due to the injection of a gas, but they cannot increase. Therefore, according to a preferred embodiment, the cube of bound B3 is equal to the cube Reference1 (seismic impedances resulting from the stratigraphic inversion of data DSAI): B3=Reference1.

The derivability of the anamorphosis imposed by the conjugate-gradient optimization compels selecting B4 to be strictly greater than B3, and preferably by at least some percentages.

For the cube of bound B2, a constant value smaller than any likely impedance is preferably used.

For the cube of bound B1, a constant value, strictly less than impedance B2, is positive, is preferably used.

4. Inversion with Anamorphosis of the Seismic Data Acquired after Injection

A stratigraphic inversion of data DSPI is carried out. This stratigraphic inversion allows association with each cell of the cube a post-injection P-wave seismic impedance IP2.

The same inversion technique as in stage 2 is used, but by applying anamorphosis function $\alpha$ to seismic impedances IP2.

The concept is: a Gaussian impedance is optimized to obtain by inverse anamorphosis of the true impedance, towards which the geological functional is directed, but swiftly must go back to the true impedances in order to correctly evaluate the seismic functional.

Precisely, Equation (2) describes the global functional with the anamorphosis $Iv = \alpha(Ig)$, Iv being the true impedance and Ig the Gaussian impedance.

$$F(Ig) = p_1\|w*R(\alpha(Ig)) - S_0\|_{L2} + p_2\|Ig - Ig_0\|_{L2} + p_3\|P_T(\nabla(Ig - Ig_0))\|_{L2} \quad (2)$$

Another writing is possible with $Ig = \beta(Iv)$, equivalent to the previous one and perhaps more natural, $$F(Iv) = p_1\|w*R(Iv) - S_0\|_{L2} + p_2\|\beta(Iv) - \beta(Iv_0)\|_{L2} + p_3\|P_T(\nabla(\beta(Iv) - \beta(Iv_0)))\|_{L2} \quad (3)$$

but Equation (2) is clearly more easily programmable.
To apply this inversion technique, the following applies:
the wavelet of FIG. 4,
Reference1 as the a priori model,
an initial model of constant impedance 3500,
a 15% noise-to-signal ratio,
an uncertainty on the a priori impedance of 500,
a correlation length of 50 m,
a maximum number of iterations of 300, and
the cubes of anamorphosis bounds B1, B2, B3 and B4 defined in stage 3.

The Interwell® (IFP, France) or Presti® (IFP, France) softwares can be used to perform this stage.

5. Injected Gas Location

The gas injected into the zone is then located by identifying the cells of the cube where seismic impedance IP2 is smaller than seismic impedance IP1.

6. Injected Gas Volume Estimation

The goal of gas storage monitoring is to image the subsoil in a qualitative as well as quantitative manner, for example, by evaluating the volume of gas stored.

The data cubes used have cells known as "voxels" (contraction of "volumetric pixel"). These cells are of known dimensions $\Delta x$, $\Delta y$ and $\Delta z$. In the horizontal directions, these dimensions $\Delta x$ and $\Delta y$ are known as "intertraces". These are acquisition data that correspond to the distances between the successive recording points for the same shotpoint, respectively in directions x and y. Vertical dimension $\Delta z$ is the seismic data recording sampling rate $\Delta t$ converted to depth by time-depth conversion.

The total volume of gas injected, denoted by VTC, can be calculated by adding up all the values of the gas saturation cube weighted by the rock porosity (I), and by weighting the result by the volume occupied by a cell, i.e. That is:

$$VTC = \Delta x \times \Delta y \times \Delta z \sum_{x,y,z} \phi(x, y, z) \times SCP(x, y, z) \quad (16)$$

The rock porosity $\phi$, defined by the ratio of the pore volume to the total volume of the rock, is measured or estimated by specialists from logs or measurements on samples from wells (For example, Calvert, 2005). This quantity is a characteristic of the porous medium.

Figure 8:
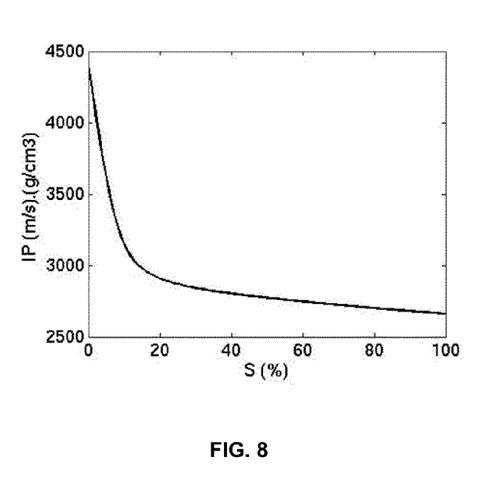
FIG. 8 illustrates a relation between gas saturation S and the P impedance IP.

The volume of gas can be evaluated for each model using the gas saturation (S) vs. P impedance (IP) relation of FIG. 8. This relation is highly non-linear because a very small amount of gas is sufficient to noticeably increase the compressibility of the fluid phase, therefore that of the rock.

Table 1 gives, for models Monitor1, Monitor2 and Monitor3, and for the exact model Monitor:

the gas volumes V estimated using the saturation-P impedance law of FIG. 8, the standard deviation D of the impedance difference with Monitor with it being clear that using the anamorphosis to limit the impedance increase improves the accuracy of the result, whether a standard deviation or a measured gas volume, the minimum impedance Imin, and the maximum impedance Imax.

| Model | Imin | Imax | D | V (hm³) |
|---|---|---|---|---|
| Monitor | 2670 | 5500 | (0) | 13.95 |
| Monitor1 | 2896 | 6249 | 109 | 5.46 |
| Monitor2 | 2758 | 5651 | 58 | 8.71 |
| Monitor3 | 2729 | 5602 | 44 | 10.42 |

Variants

The invention has been described within the context of a post-stack stratigraphic inversion, but it can also be applied within the context of a multi-component data stratigraphic inversion (FR-2,800,473 and FR-2,873,823), or within the context of a pre-stack stratigraphic inversion (FR-2,800,473), or within the context of a stratigraphic conversion with the anisotropy taken into account.

In pre-stack stratigraphic inversion, several partial stacks are used corresponding to various angles of incidence upon reflection. The variation of the reflection coefficient as a function of this angle provides information non only about the P impedance, but also about the S impedance and the density. It can be noted that the S impedance is then not as well determined as the P impedance, and the density still less. In case of carbon dioxide injection, the S impedance and the density decrease so that, as for the P impedance, an anamorphosis is used to prevent them from increasing.

In this case, an anamorphosis is applied to the following three quantities: P impedance, S impedance and density.

Regarding the P impedance, the S impedance and the density, information exists not only on each one of above, but also on coupled quantities such as the Poisson coefficient and the shear modulus. If the Poisson coefficient is known with some precision, then the cubes of anamorphosis bounds BS1, BS2, BS3 and BS4 of the S impedance can be selected as a function of this precision. If BP1 and BP4 is the interval of the possible Poisson coefficients and BP2 and BP3 is the interval of the likeliest Poisson coefficients, then the anamorphosis bounds of the S impedance are $$BSn = IP_0 \sqrt{\frac{1 - 2BPn}{2(1 - BPn)}},$$

n ranging from 1 to 4 and $IP_0$ designating the a priori P impedance. At the end of the inversion, since the optimum P impedance can substantially differ from the a priori impedance, it may be judicious to re-evaluate the bounds of the S impedance for further optimization. As above, this can be applied pixel by pixel by constructing anamorphosis bound cubes.

In the case of carbon dioxide injection into a reservoir, it happens that the permeability is sufficient for the pressure to remain stable. The effective stress is thus unchanged and the elastic properties of the solid matrix are kept, in particular the shear modulus $\mu$. Since $IS^2 = \mu\rho$, IS being the S impedance and $\rho$ being the density, bounds BDn are defined on the density: $BDn = BSn^2/\mu_0$ with $\mu_0$ being the a priori shear modulus. The great advantage of joint inversion is that the shear modulus is constant over time, the aforementioned equation $IS^2 = \mu\rho$ introduces a relation between pairs (IS, $\rho$) in the various periods which are stronger since the periods are more numerous. As before, the optimum S impedance can substantially differ from the a priori impedance, and a re-evaluation of the bounds on the density is carried out prior to further optimization.

It is possible to avoid this further optimization by adding two new functionals to the conventional sum which are seismic functional plus a priori functional on each parameter. The function relates to the Poisson coefficient and is expressed as follows:

$$F_P = \frac{1}{2} \sum_\Omega \left( \frac{2R - 1}{2(R - 1)} - v_0 \right)^2,$$

with $R = IS^2/IP^2$, and $\Omega$ being the inverted domain (the seismic cube encompassing the reservoir) and $v_0$ being the a priori Poisson coefficient. The second one expresses the constancy of the shear modulus, $$F_C = \frac{1}{2} \sum_{n=2}^{N} \sum_\Omega \left( \frac{\rho_n}{IS_n^2} - \frac{\rho_{n-1}}{IS_{n-1}^2} \right)^2,$$

with N being the number of periods, and $\rho_n$ and $IS_n$ respectively being the density and the S impedance at period n.

The invention has been described with gas injection, but it can also be applied to withdrawal of a fluid from an underground formation. In this case, the impedances can increase as a result of the gas withdrawal, but they cannot decrease. Therefore, according to an embodiment, it is the cube of bound B2 that is equal to the cube of the pre-withdrawal seismic impedances, obtained from the stratigraphic inversion of data DSAI. In this case, the gas production zones are located by spotting the zones where the post-production impedances are higher than the pre-production impedances.

In this context, it is also possible to determine an extracted gas volume by carrying out the following stages:

determining the porosity of the underground formation;
selecting a relation between gas saturation and P-wave seismic impedance as a function of porosity;
associating with each cell of the cube a gas saturation value by using the relation with the P-wave seismic values after extraction; and
determining the volume of gas extracted by adding up all gas saturation values and by weighting a sum by the porosity and by a volume occupied by a cell of the cube.

The invention is thus applied to monitoring of a geological gas storage site, as well as to monitoring of the production of a gas contained in a geological reservoir.

EXAMPLES/ADVANTAGES

Example 1

"Wide" Anamorphosis

In this example, the inversion anamorphosis bounds are B1=1500, B2=1700, B3=7000 and B4=8000. These values, which are far from the interval of impedances concerned by the inversion, correspond to the "standard" motivation of avoiding negative impedances and excessively large values.

Figure 6A:
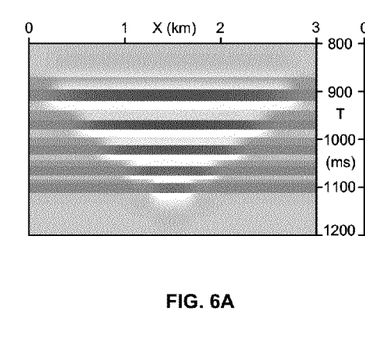
FIG. 6A corresponds to the result, denoted by Monitor 1, of the stratigraphic inversion of the seismic data of FIG. 3B using the following bounds: B1=1500, B2=1700, B3=7000 and B4=8000.

The seismic impedances resulting from this stratigraphic inversion are denoted by Monitor1 and they are illustrated in FIG. 6A.

FIG. 6A shows a marked impedance decrease in the sandstones, associated with an equally marked impedance increase in the clays and the sandy clays. This increase, which should not occur because the clays are not affected by gas filling, is explained by the fact that the seismic is of zero mean, so that a pure impedance decrease is inevitably translated into the association of a decrease and of an increase nearby.

Example 2

"Constant Constraint" Anamorphosis

Knowing that the impedances can decrease but not increase between Reference and Monitor, the inversion anamorphosis bounds are B1=1500, B2=1700, B3=5480, which is the maximum value of Reference1, and B4=B3+5%.

Figure 6B:
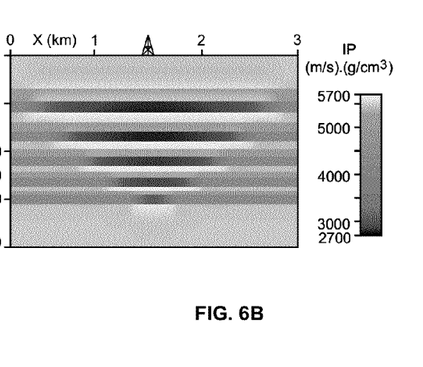
FIG. 6B corresponds to the result, denoted by Monitor 2, of the stratigraphic inversion of the seismic data of FIG. 3B by setting bound B3 of the anamorphosis at 5480 (the maximum of Reference1), B4 at B3+5%, and B1=1500, B2=1700

The seismic impedances resulting from this stratigraphic inversion are denoted by Monitor2 and they are illustrated in FIG. 6B.

The impedance decrease in the sandstones is markedly stronger in relation to Monitor1, whereas the increase in the clays or the sandy clays is clearly lower. However, the fact that bound B3 is constant enables it to act, and imperfectly, only on the clays whose impedance is the highest.

Example 3

"Distributed Constraint" Anamorphosis

In this example, the "quasi non-increase" constraint is distributed, that is adjusted to each pixel, and the bounds are defined as follows:

the cube of bound B3 is equal to cube Reference1 (seismic impedances obtained from the stratigraphic inversion of data DSAI): B3=Reference1;
the cube of bound B4 is equal to the cube of bound B3 to which 5% is added to each value: B4=B3+5%;
the cube of bound B1 is a constant cube of value 1500; and
the cube of bound B2 is a constant cube of value 1700.

Figure 7:
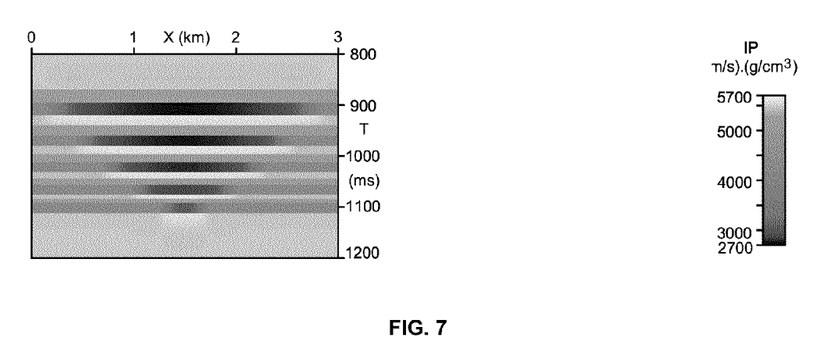
FIG. 7 corresponds to the result, denoted by Monitor 3, of the stratigraphic inversion of the seismic data of FIG. 3B using anamorphosis bound cubes.

The result of this inversion Monitor3 appears in FIG. 7, which can be compared with Monitor2 (FIG. 6B) and with the exact model Monitor (FIG. 2B).

The invention claimed is:

1. A method of monitoring an underground formation into which a gas is injected, from a first set of seismic data imaging a subsoil zone acquired before gas injection into an underground formation of the zone, and from a second set of seismic data imaging the subsoil zone acquired after the gas injection, comprising:
constructing a pre-injection P-wave seismic impedance cube by a computer programmed with software which when executed performs stratigraphic inversion of the first set of seismic data with the cube discretizing the subsoil zone into a set of cells;
defining an anamorphosis function $\alpha$ by a function comprising a positive lower limit B1, an upper limit B4, and an identity interval defined between limits B2 and B3, with B1<B2<B3<B4;
associating with each cell of the cube a value for each limit B1, B2, B3 and B4;
associating with each cell of the cube a post-injection P-wave seismic impedance by a computer programmed with software which when executed performs stratigraphic inversion of the second set of seismic data wherein the anamorphosis function $\alpha$ is applied to the post-injection P-wave seismic impedance; and
locating the gas within the zone by comparing the post injection P-wave seismic impedance with the seismic pre-injection P wave impedance.

2. A method as claimed in claim 1, wherein the anamorphosis function is used to obtain the post-injection P-wave seismic impedances during stratigraphic inversion of the second set of seismic data, by minimizing a global functional F(Ig) as follows:

$$F(Ig)=p_1\|w^*R(\alpha(Ig))-S_0\|_{L2}+p_2\|(Ig-Ig_0)_{L2}+p_3\|P_T(\nabla(Ig-Ig_0))\|_{L2}$$

wherein Ig represents Gaussian impedances and $\alpha(Ig)$ is the post-injection P-wave seismic impedance; $p_1$, $p_2$ and $p_3$ are weights;
w is an estimated wavelet;
$R(\alpha(Ig))$ is a reflection coefficient field calculated from the post-injection P-wave seismic impedance;
* represents the convolution product;
$S_0$ is the second set of seismic data, and
$P_T$ represents a projection onto a plane tangential to a local lamina of a sedimentary lamination.

3. A method as claimed in claim 1, wherein the seismic data are post-stack data or multi-component data.

4. A method as claimed in claim 2, wherein the seismic data are post-stack data or multi-component data.

5. A method as claimed in claim 1, wherein the seismic data are pre-stack data and each cell is associated with:
a pre-injection S-wave seismic impedance;
a post-injection S-wave seismic impedance obtained by the stratigraphic inversion of the second set of seismic data, wherein a second anamorphosis function is used for the S-wave seismic impedances; and the gas is located in the zone by comparing the post-injection P-wave seismic impedance with pre-injection P-wave seismic impedance and by comparing the post-injection S-wave seismic impedance with the pre-injection S-wave seismic impedance.

6. A method as claimed in claim 2, wherein the seismic data are pre-stack data and each cell is associated with:
a pre-injection S-wave seismic impedance;
a post-injection S-wave seismic impedance obtained by the stratigraphic inversion of the second set of seismic data, wherein a second anamorphosis function is used for the S-wave seismic impedances; and
the gas is located in the zone by comparing the post-injection P-wave seismic impedance with pre-injection P-wave seismic impedance and by comparing the post-injection S-wave seismic impedance with the pre-injection S-wave seismic impedance.

7. A method as claimed in claim 5, wherein the second anamorphosis function is defined by a function comprising a positive lower limit BS1, an upper limit BS4, an identity interval defined between limits BS2 and BS3, with BS1<BS2<BS3<BS4, and $$BSn = IP_0 \sqrt{\frac{1 - 2BPn}{2(1 - BPn)}}$$

with n being an integer from 1 to 4; IP0 is an a priori P-wave seismic impedance; BP1 and BP4 being lower and upper limits of an interval of possible Poisson coefficients; and BP2 and BP3 being lower and upper limits of an interval of likeliest Poisson coefficients.

8. A method as claimed in claim 6, wherein the second anamorphosis function is defined by a function comprising a positive lower limit BS1, an upper limit BS4, an identity interval defined between limits BS2 and BS3, with BS1<BS2<BS3<BS4, and $$BSn = IP_0 \sqrt{\frac{1 - 2BPn}{2(1 - BPn)}}$$

with n being an integer from 1 to 4; IP0 is an a priori P-wave seismic impedance; BP1 and BP4 being lower and upper limits of an interval of possible Poisson coefficients; and BP2 and BP3 being lower and upper limits of an interval of likeliest Poisson coefficients.

9. A method as claimed in claim 7, wherein the stratigraphic inversion of the second set of seismic data comprises a minimization of a cost function comprising the functional Fp:

$$F_P = \frac{1}{2} \sum_\Omega \left( \frac{2R - 1}{2(R - 1)} - v_0 \right)^2$$

with: R=(IS2/PS2)², Ω represents the zone,
$v_0$ is an a priori Poisson coefficient, IS2 is a post-injection S-wave seismic impedance and IP2 is a post-injection P-wave seismic impedance.

10. A method as claimed in claim 8, wherein the stratigraphic inversion of the second set of seismic data comprises a minimization of a cost function comprising the functional Fp:

$$F_P = \frac{1}{2} \sum_\Omega \left( \frac{2R - 1}{2(R - 1)} - v_0 \right)^2$$

with: R=(IS2/IP2)², Ω represents the zone,
$v_0$ is an a priori Poisson coefficient, IS2 is a post-injection S-wave seismic impedance and IP2 is a post-injection P-wave seismic impedance.

11. A method as claimed in claim 5, wherein each cell is associated with:
a pre-injection density of the underground formation;
a post-injection density of the underground formation obtained by the stratigraphic inversion of the second set of seismic data and wherein a third anamorphosis function is applied to the post-injection densities; and
the gas is located in the zone by comparing the post-injection P-wave seismic impedance with the pre-injection P-wave seismic impedance, by comparing the post-injection S-wave seismic impedance with the pre-injection S-wave seismic impedance, and by comparing the post-injection density with the pre-injection density.

12. A method as claimed in claim 6, wherein each cell is associated with:
a pre-injection density of the underground formation;
a post-injection density of the underground formation obtained by the stratigraphic inversion of the second set of seismic data and wherein a third anamorphosis function is applied to the post-injection densities; and
the gas is located in the zone by comparing the post-injection P-wave seismic impedance with the pre-injection P-wave seismic impedance, by comparing the post-injection S-wave seismic impedance with the pre-injection S-wave seismic impedance, and by comparing the post-injection density with the pre-injection density.

13. A method as claimed in claim 7, wherein each cell is associated with:
a pre-injection density of the underground formation;
a post-injection density of the underground formation obtained by the stratigraphic inversion of the second set of seismic data and wherein a third anamorphosis function is applied to the post-injection densities; and
the gas is located in the zone by comparing the post-injection P-wave seismic impedance with the pre-injection P-wave seismic impedance, by comparing the post-injection S-wave seismic impedance with the pre-injection S-wave seismic impedance, and by comparing the post-injection density with the pre-injection density.

14. A method as claimed in claim 8, wherein each cell is associated with:
a pre-injection density of the underground formation;
a post-injection density of the underground formation obtained by the stratigraphic inversion of the second set of seismic data and wherein a third anamorphosis function is applied to the post-injection densities; and
the gas is located in the zone by comparing the post-injection P-wave seismic impedance with the pre-injection P-wave seismic impedance, by comparing the post-injection S-wave seismic impedance with the pre-injection S-wave seismic impedance, and by comparing the post-injection density with the pre-injection density.

15. A method as claimed in claim 9, wherein each cell is associated with:
a pre-injection density of the underground formation;
a post-injection density of the underground formation obtained by the stratigraphic inversion of the second set of seismic data and wherein a third anamorphosis function is applied to the post-injection densities; and the gas is located in the zone by comparing the post-injection P-wave seismic impedance with the pre-injection P-wave seismic impedance, by comparing the post-injection S-wave seismic impedance with the pre-injection S-wave seismic impedance, and by comparing the post-injection density with the pre-injection density.

16. A method as claimed in claim 10, wherein each cell is associated with:
   a pre-injection density of the underground formation;
   a post-injection density of the underground formation obtained by the stratigraphic inversion of the second set of seismic data and wherein a third anamorphosis function is applied to the post-injection densities; and
   the gas is located in the zone by comparing the post-injection P-wave seismic impedance with the pre-injection P-wave seismic impedance, by comparing the post-injection S-wave seismic impedance with the pre-injection S-wave seismic impedance, and by comparing the post-injection density with the pre-injection density.

17. A method as claimed in claim 11, wherein the third anamorphosis function is defined by a function comprising a positive lower limit BD1, an upper limit BD4, an identity interval defined between limits BD2 and BD3, with BD1<BD2<BD3<BD4, and $$BDn = BSn^2/\mu_0$$

with $\mu$ being an a priori shear modulus.

18. A method as claimed in claim 17, wherein the stratigraphic inversion of the second set of seismic data comprises a minimization of the cost function comprising a functional FC:

$$F_C = \frac{1}{2} \sum_{j=2}^{N} \sum_{\Omega} \left( \frac{\rho_j}{IS2_j^2} - \frac{\rho_{j-1}}{IS2_{j-1}^2} \right)^2$$

with N being a number of periods, $\rho_j$ and $IS_j$ being respectively a density and an S-wave seismic impedance at a period j.

19. A method as claimed in claim 1, wherein a value of limit B3 in a cell is equal to the pre-injection P-wave seismic impedance of the cell.

20. A method as claimed in claim 1, wherein a volume of the injected gas is determined by:
   determining a mean porosity of the underground formation;
   selecting a relation between gas saturation and P-wave seismic impedance;
   associating with each cell of the cube a gas saturation value by applying the relation to the post-injection P-wave seismic impedance values; and
   determining the injected gas volume by adding all gas saturation values and by weighting the sum by the mean porosity and by a volume occupied by a cell of the cube.

21. A method as claimed in claim 1, wherein gas injection is replaced by gas extraction from the formation, the first seismic data set is acquired before gas production and the second seismic data set is acquired after the gas production.

22. A method as claimed in claim 21, wherein a value of limit B2 in a cell is equal to the pre-injection P-wave seismic impedance of the cell.

23. A method as claimed in claim 21, wherein a volume of the extracted gas is also determined by:
   determining a porosity of the underground formation;
   selecting a relation between gas saturation and P-wave seismic impedance as a function of porosity;
   associating with each cell of the cube a gas saturation value by applying the relation to the post-extraction P-wave seismic impedance values; and
   determining the extracted gas volume by obtaining a sum of all gas saturation values and by weighting the sum by the porosity and by a volume occupied by a cell of the cube.

24. A method as claimed in claim 22, wherein a volume of the extracted gas is also determined by:
   determining a porosity of the underground formation;
   selecting a relation between gas saturation and P-wave seismic impedance as a function of porosity;
   associating with each cell of the cube a gas saturation value by applying the relation to the post-extraction P-wave seismic impedance values; and
   determining the extracted gas volume by obtaining a sum of all gas saturation values and by weighting the sum by the porosity and by a volume occupied by a cell of the cube.

* * * * *